Jan. 13, 1953 J. L. HIGHT 2,625,423
AUTOMATIC MULTIPLE PARACHUTE DISCONNECT DEVICE
Filed March 7, 1952 3 Sheets-Sheet 1

INVENTOR.
JAMES L. HIGHT

Jan. 13, 1953          J. L. HIGHT          2,625,423
AUTOMATIC MULTIPLE PARACHUTE DISCONNECT DEVICE
Filed March 7, 1952          3 Sheets-Sheet 2
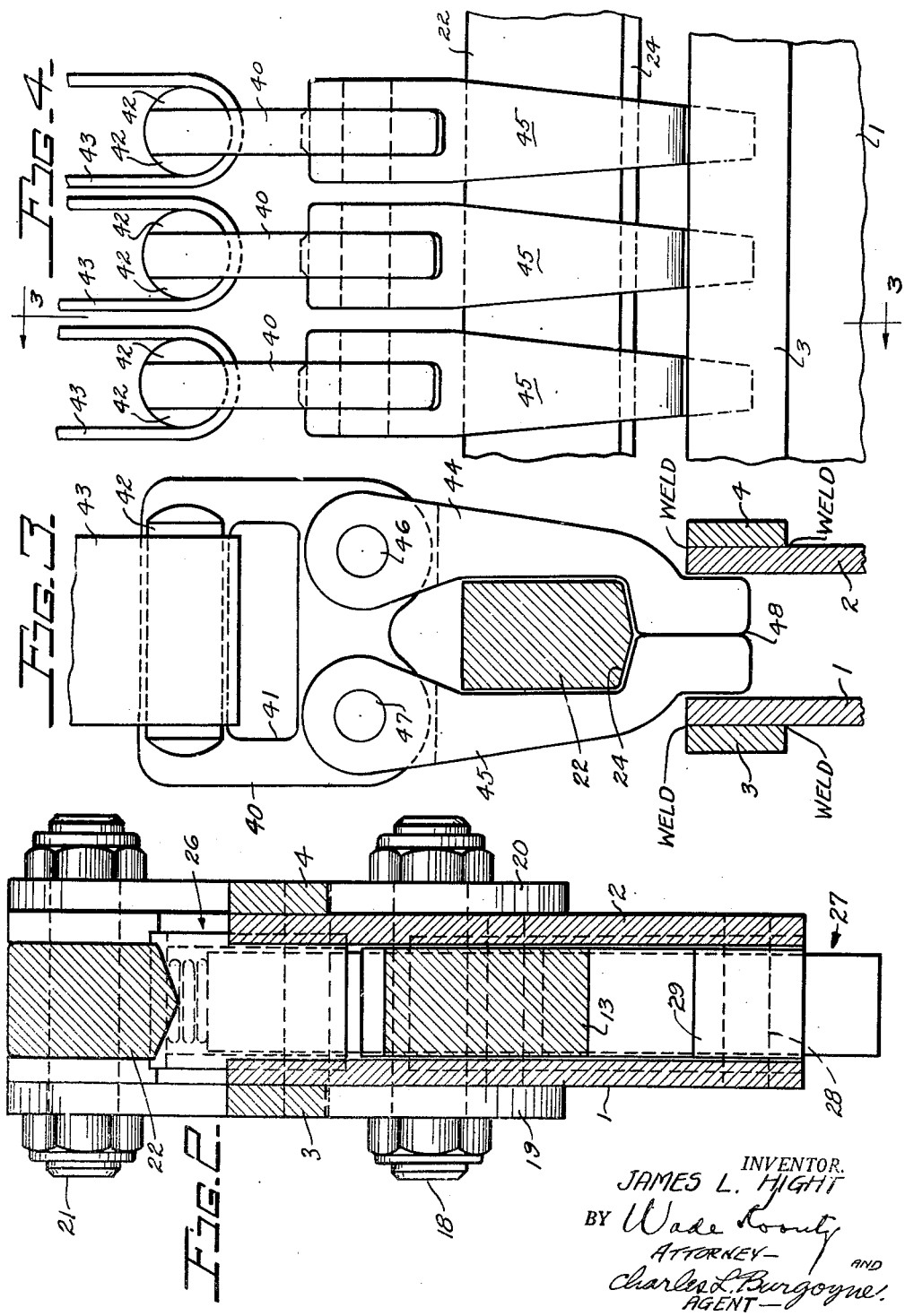
INVENTOR.
JAMES L. HIGHT Jan. 13, 1953 J. L. HIGHT 2,625,423
AUTOMATIC MULTIPLE PARACHUTE DISCONNECT DEVICE
Filed March 7, 1952 3 Sheets-Sheet 3
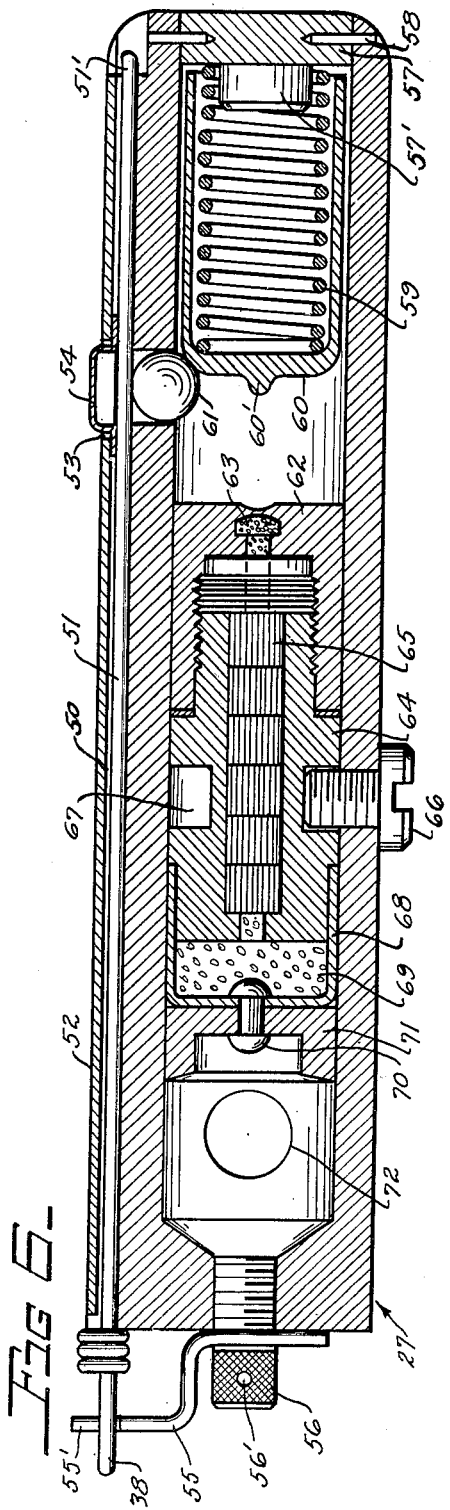
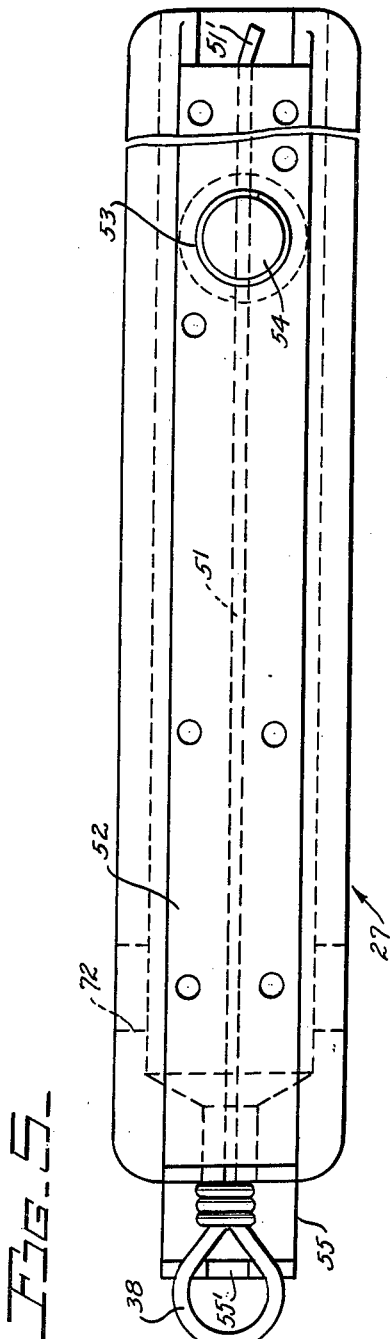
INVENTOR.
JAMES L. HIGHT
BY Wade Loomis AND
ATTORNEY —
Charles L. Burgoyne
AGENT —

Patented Jan. 13, 1953

2,625,423

UNITED STATES PATENT OFFICE 2,625,423

AUTOMATIC MULTIPLE PARACHUTE DISCONNECT DEVICE

James L. Hight, Fort Bragg, N. C.

Application March 7, 1952, Serial No. 275,448

5 Claims. (Cl. 294—83)

(Granted under Title 35, U. S. Code (1952), sec. 266)

The invention described herein may be manufactured and used by or for the United States Government for governmental purposes without payment to me of any royalty thereon.

The present invention relates to an automatic parachute disconnect device for use with multiple parachutes in the aerial delivery of cargo and vehicles.

The primary object of the invention is to provide a disconnect device or releasable connector assembly for attaching a plurality of parachutes to a load and to provide means to positively prevent release of the load while the parachutes and attached load are being stabilized in the air and to further provide means to cause release of the parachutes from the load upon ground contact by the load.

A further object of the invention is to provide a releasable connector assembly for attaching a plurality of parachutes to a load and to provide means to positively prevent release of the load while the parachutes and attached load are being stabilized in the air and to further provide means responsive to ground contact by the load to cause release of the parachutes one-by-one in rapid succession from the load, so that the releasable connector assembly will not be suddenly released from the parachutes and projected against people or equipment standing nearby.

Another object of the invention is to provide a load connector assembly particularly adapted for use in connecting a plurality of parachutes to a load to be delivered from an airplane and to provide means responsive to ground contact by the load to cause release of the parachutes one-by-one in rapid succession from the load.

The above and other objects of the invention will become apparent upon reading the following detailed description in conjunction with the accompanying drawings, in which:

Fig. 2 is a transverse cross sectional view taken on line 2—2 of Fig. 1.

Fig. 3 is a transverse cross sectional view taken on line 3—3 of Fig. 4.

Fig. 4 is a side elevation view of a portion of the parachute disconnect device showing the manner of attaching individual parachutes thereto.

Fig. 5 is a plan view to an enlarged scale of the cutter-containing securing bar forming a vital part of the assembly shown in Fig. 1; and, Fig. 6 is a central longitudinal cross sectional view of the cutter-containing securing bar shown in Fig. 5.

Figure 1:
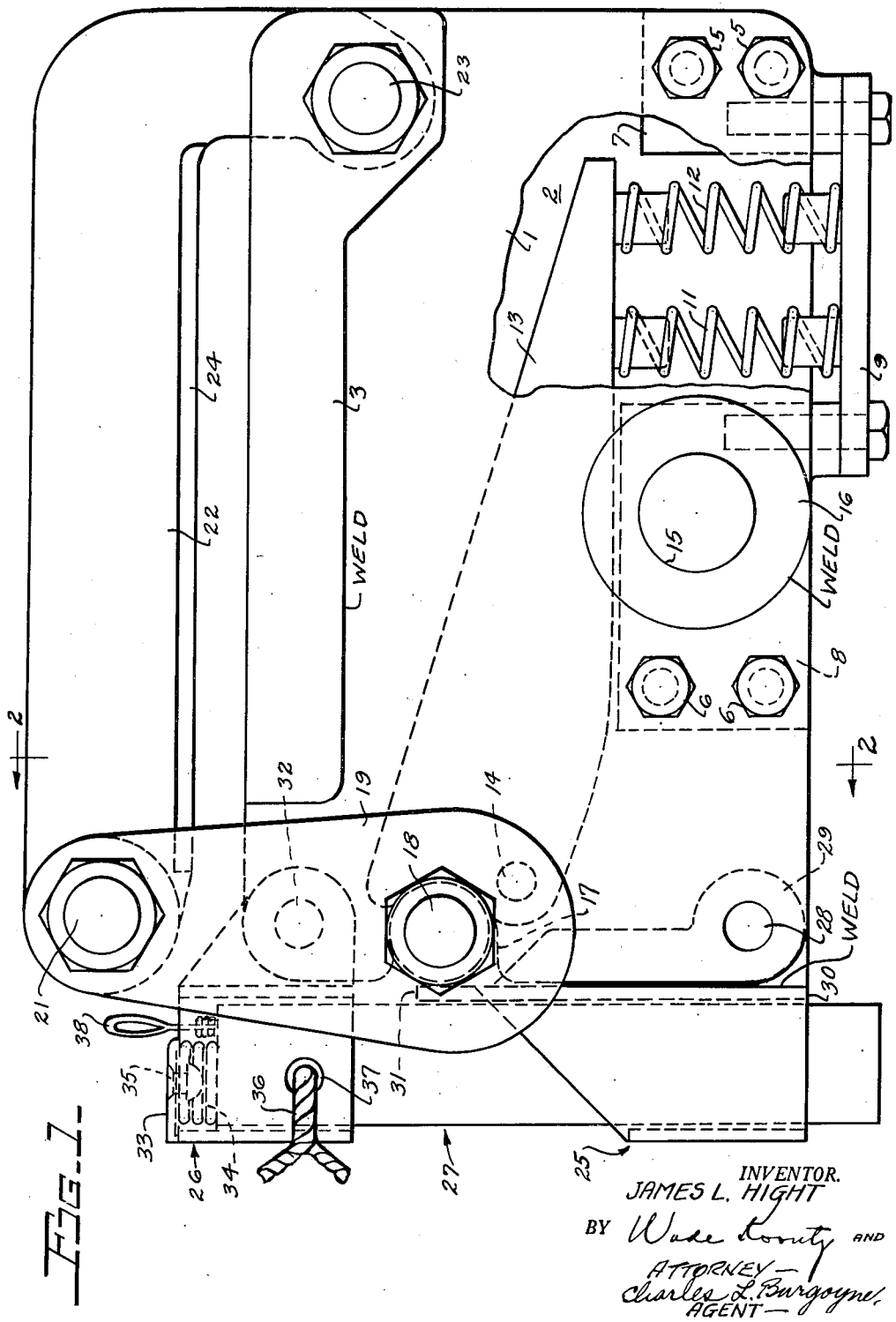
Fig. 1 is a side elevation view of the parachute disconnect device.

The present automatically releasable load connector for multiple parachutes is of general utility in effecting release of a group or cluster of parachutes from a load when the load touches the ground but is of particular utility in releasing parachutes from vehicles and howitzers in the aerial delivery of such equipment. The load connector includes a horizontally-disposed pivotally-mounted bar to which the separate parachutes are attached and from which they are released in serial fashion as the load touches the ground. The load connector includes features in common with that disclosed in my copending application Serial No. 206,412 filed January 17, 1951. The present invention may be considered an improvement over that disclosed in the prior application, since it has capabilities not possessed by the earlier device.

Connector assembly

For a detailed description of the invention reference is first made to Figs. 1 and 2 of the drawings. The releasable connector or load releasing device includes in its preferred form a pair of spaced parallel body members or plates 1 and 2 normally standing in vertical planes. The plates include reinforcing and strengthening plate overlays 3 and 4 welded along their edges to the plates. The plates 1 and 2 are maintained in rigidly connected spaced relation by means of pairs of bolts 5 and 6 passing through the plates and also through intervening blocks 7 and 8. Mounted in connecting relation between the blocks 7 and 8 is a bridging plate 9 serving as a spring abutment for a pair of compression springs 11 and 12 acting at all times to bias a rotatable ejector member 13 in counterclockwise direction about its pivot 14. The main plates 1 and 2 each have an aperture 15 near the lower edge in a central location and the holes are reinforced by flat rings 16 welded in place as shown (Fig. 1). A suitable shackle or clevis is secured to the plates by passing a portion thereof through the coinciding holes 15 and the shackle is then made secure to a load which is to be delivered from an airplane to the ground.

At one vertical side edge the plates 1 and 2 are notched or recessed, as at 17, and the upper side of the recess is hollowed out slightly to retain a cross pin 18 on swinging latch members 19 and 20 as long as there is a very substantial pull on the plates 1 and 2 due to the airborne load secured through holes 15. The ejector member 13 is adapted to push the pin 18 out of recess 17 as soon as the load touches the ground, provided of course that a safety device to be described has been released to open the outer end of the recess 17. The latch members 19 and 20 are pivoted on a cross-pin 21 passing through the parachute connecting bar or beam 22 pivoted between the plates 1 and 2 by means of another cross-pin 23. The lower side of the bar 22 is of shallow V-shaped cross section, as at 24 (see Fig. 3). The end of bar 22 closest to pin 23 is of right angular formation so that when the bar is in its latched position, as shown in Fig. 1, the main portion thereof will extend in a generally horizontal direction.

The safety device to close the outer open end of the recess 17 comprises three principal parts, a swinging latch member or blocking member 25, a companion swinging member 26 and a securing bar 27. The blocking member is pivoted to the plates 1 and 2 by a transverse pivot 28 and the member is made up of a hinge portion 29 welded on a wall of a guide portion 30 in which the securing bar 27 is slidable. The upper end of the same wall to which the portion 29 is welded extends upwardly to form a blocking element 31 which prevents removal of the cross-pin 18 as long as the securing bar 27 is in place, as shown. The upper swinging member 26 is pivoted between the plates 1 and 2, as at 32, and includes a guide portion receiving the upper end of securing bar 27. A top wall 33 extends part way over the upper end of swinging member 26 and this top wall has secured on its under side a compression spring 34 held in place by means of a rivet 35. The spring 34 acts to force the securing bar downwardly when a securing loop of heavy cord 36 has been cut by means of a cutter contained within the bar 27. The loop 36 is threaded through coinciding holes 37 in the swinging member 26 and also through a hole extending through the securing bar 27. When the cord 36 has been cut the bar 27 is pushed downwardly by the spring 34 and as the bar clears the upper swinging member 26, the lower swinging member 25 drops downwardly and leaves the recess 17 open at its forward side. Release of the bar 27 is initiated by a pull on a wire loop 38 which is attached by a static line to the aircraft used in the aerial delivery operation. Thus as the load and parachutes are ejected from the aircraft and start to fall, the static line (not shown) pulls the loop 38 and section of wire attached thereto from the securing bar 27. This action starts a train of events in the bar itself which results in cutting of the cord 36 after about ten seconds. The bar construction will be described below.

Parachute connectors

The separate and similar parachutes are connected to the connector assembly shown in Fig. 1 by means of special connectors shown in Figs. 3 and 4. Each of the connectors comprises a slotted plate 40 having welded to opposite side faces just above the rectangular slot 41 a pair of rounded elements 42 to form in conjunction with the intervening plate a circular strap engaging element. Passing through slot 41 and extending upwardly on opposite sides thereof is a strap or webbing 43 securable to an individual parachute (not shown). The number of parachutes and parachute connectors will depend on the weight of the load to be delivered from the aircraft. At the lower side of each plate 40 there is a pair of swinging fingers 44 and 45 arranged in right and left-hand orientation and pivoted to the plate at 46 and 47 respectively. The lower ends of the fingers extend toward each other to meet below the connector bar 22, as at 48. The fingers 44 and 45 are retained in the bar embracing relation shown by virtue of engagement of the outer lower edges of fingers 44 and 45 with the inner confronting faces of the side plates 1 and 2. Such securing relation is maintained as long as the bar 22 is held in parallel relation to the upper edges of plates 1 and 2, as shown in Fig. 1. This is the function of the swinging latch members 19 and 20 carrying the cross-pin 18 at their lower ends. However, after the recess blocking member 25 has swung down to open the recess 17, the pin 18 is free to be pushed out of the recess by the spring-actuated member 13 as soon as the parachute supported load has contacted the ground. As the load reaches the ground the force tending to hold the pin in the upper hollowed-out side of recess 17 is reduced so low that the member 13 will immediately rotate in a counterclockwise direction and kick the pin 18 out of recess 17. Now as the bar 22 moves upwardly about pivot 23 by the pull of the parachutes, the parachute connector closest to the latch members 19 and 20 is released first as the fingers 44 and 45 move up above the side plates 1 and 2. The beveled formation on the under side of bar 22 causes the fingers 44 and 45 to spread apart so that the parachute connector and parachute comes free of the connector assembly. As the bar 22 moves up farther the next parachute connector is released and so on until the one closest to the pivoted end of the bar is finally released. Thus it will be seen that release of the parachutes from the connector assembly comes in fairly rapid succession but only one at a time, so that the connector assembly is free to settle slowly toward the load. Sudden release of all chutes simultaneously is apt to snap the load connector assembly violently against personnel and cargo adjacent thereto. It will be understood that the parachutes will generally be subject to prevailing winds causing them to be blown free as soon as they are released from the load. The action of wind on the parachutes also assists in freeing the parachute connectors from the load connector assembly as soon as the latch members 19, 20 and pin 18 swing to the bar releasing position about the pivot 21, since the force on the chutes as well as the weight of the load connector assembly causes the bar 22 to be rotated upwardly.

Securing bar construction

The securing bar 27 is shown in detail in Figs. 5 and 6 to a scale about double actual size. In external appearance the bar is a smooth metallic elongated element of square cross-sectional shape and having a minimum of projections on the outer faces thereof. The bar is machined from steel bar stock and includes a central longitudinal groove 50 along one face to receive the slide wire 51 having the loop 38 at one end. A shallow longitudinal recess along the bar provides a space to receive a thin groove-covering strip 52 pinned securely to the bar itself. An aperture 53 in the strip 52 is filled by a flanged cup 54 held down by the strip and providing a recess to receive a ball detent when the slide pin 51 is pulled free of the bar. The pin 51 has one end 51' normally bent slightly to resist removal of the pin. In practice the bend should be of such proportions as to require a 10 to 25 pound pull for release from the bar by sliding through the groove 50. At the end of the bar adjacent to loop 38 there is provided a safety clip 55 having a tongue 55' extending through the loop 38. The clip includes an apertured base portion attached to the bar by a thumb screw 56 threading axially into the bar. Before the bar goes into service the screw 56 and clip 55 are removed. When quantities of the bars are shipped there should be a sealing wire through the aperture 56' in the screw 56 and looped around the clip 55.

The bar is longitudinally bored out throughout most of its length and after the cutter mechanism is inserted the bore is closed by a round plug 57 secured in place by transverse pins 58. The plug 57 carries a spring positioning boss 57' and the associated compression spring 59 extends into a cup-like detonator 60 including a detonating projection 60' on the closed end. The detonator is maintained in the cocked position by a ball detent 61 normally held part way inside the central bore by the slide pin 51. Spaced from the detonator is a detonating charge retainer 62 having a detonating charge 63 enclosed therein. The retainer 62 is threaded over a powder magazine 64 having a central bore to contain a series of slugs 65 of slow burning powder. The assembled members 62 and 64 are held in relatively stationary position by a screw 66 threaded into the bar itself and extending into an annular groove 67 in the member 64. Between the member 64 and an adjacent cup 68 is a propelling powder charge 69 touched off after the contiguous slug 65 has burned through. Attached to the end wall of the cup 68 by means of rivet 70 is a hollowed-out cord cutter 71 adapted to shear a cord extending through the transverse hole 72. The manner in which the cutter mechanism functions is obvious but it should be noted that in the present application thereof, the slow burning powder charge used in the slugs 65 is so compounded as to require ten seconds to burn from one end to the other of the charge. Thus from the time the detent releasing wire 51 is pulled from the bar until the propelling charge 69 is set off to fire the cutter 71 there is a period of about ten seconds. This time period may be changed to some extent but is preferably increased in duration, rather than being decreased.

*Summary of operation*

To use the present releasable load connector with a plurality of parachutes in the aerial delivery of cargo and vehicles, the latch members 19 and 20 and connecting pin 18 are swung to the unlatched position in the absence of the securing bar 27. The parachute connector bar 22 is rotated away from the parallel side plates 1 and 2 and a plurality of the parachute connectors 40, 44, 45 are installed on the bar 22 in embracing relation (see Figs. 3 and 4). The connectors should be placed at evenly spaced intervals along the bar 22, so therefore if the number of connectors and attached parachutes is fewer than is required to take up the whole length of bar 22 suitable spacers should be used between adjacent connectors to maintain proper distribution of the vertical forces on the load connector assembly. The next step is to close the bar 22 and latch it in position parallel to the upper edges of side plates 1 and 2, with the lower ends of fingers 44 and 45 lodged between the side plates 1 and 2 (see Figs. 3 and 4). With the pin 18 connecting the latch members 19 and 20 in the recess 17, the next step is to insert the securing bar 27 in the guide members 25 and 26 and then tie the securing loop 36 in place with the loop passing through the coinciding holes 37 in the member 26 and hole 72 in securing bar 27. Now the assembly is ready for use after the load is connected to the plates 1 and 2 by means of apertures 15 passing therethrough and after the parachutes are secured to the connectors 40, 44, 45.

After the load, connector assembly and parachutes are arranged on the aircraft and made ready for an aerial delivery operation, usually by ejection through the open rear end of a special cargo aircraft, the wire loop 38 on the securing bar is connected to the aircraft frame by a static line. Now as the cargo, with the parachutes folded in place thereon, is ejected from the airplane the load and parachutes drop causing the static line to pull the loop 38 and slide wire 51 from the securing bar 27. As the chutes open up and become stabilized with respect to the falling load or cargo the securing bar 27 is on the way to being released from the load connector assembly. About ten seconds after the wire 51 has been pulled from the bar, the cord cutter 71 is fired by the powder charge 69 and the cord loop 36 is severed. The compressed coil spring 34 now pushes the securing bar 27 out of the guide member 26, assisted by the force of gravity acting on the bar. The blocking member 25 now drops down and the blocking element 31 thereof is no longer in blocking position with respect to the recess 17. Now the load and chutes have become stabilized and continue dropping nearly vertically until the load touches the ground. Now the force tending to hold the cross-pin 18 in the upper hollowed-out side of the recess 17 is only that due to the action of wind on the parachutes. The force component tending to hold the pin in the recess 17 will now be insufficient to overcome the force exerted laterally on the pin by the spring biased member 13. Consequently the pin 18 will be forced out of recess 17 and the parachute connecting bar 22 will be swung upwardly by the force of the prevailing winds on the parachutes. Now the parachute connectors 40, 44, 45 will be released one-by-one as the lower ends of fingers 44 and 45 clear the upper edges of side plates 1 and 2. Releasing the parachutes from the load connector prevents tipping of the load due to wind forces on the parachutes. Also the automatic release of the parachutes saves time in getting the cargo or vehicles into immediate use. In combat operations this time saving feature may be of the utmost importance. Releasing of the parachutes from the load connector in a serial fashion lets the load connector assembly down easier and tends to prevent accidents and injuries. Aerial delivery of vehicles, howitzers, bulldozers and other heavy equipment is a hazardous operation at best and any refinements in the technique and delivery devices are much to be desired. The straps 43 connecting the parachute connectors to the parachutes may be of woven textile webbing but it is often preferred to use steel strapping because of its superior resistance to shock incurred when the parachutes open up.

The embodiment of the invention herein shown and described is to be regarded as illustrative only and it is to be understood that the invention is susceptible of variations, modifications and changes within the scope of the appended claims.

I claim:

1. A parachute load connector comprising, a body member including means at the lower end thereof to connect a load to the body member, means providing a recess in one upwardly extending side edge of said body member, a normally-horizontal bar having one end pivoted at the upper end of said body member and adapted to carry a plurality of bar-embracing parachute connectors, means to latch the other end of said bar to said body member including a swinging latch having a portion extending into said recess, spring-actuated means acting to bias said portion in a direction out of said recess, securing means movably mounted on said body member to close said recess and prevent ejection of said latch means portion therefrom, means to retain said securing means in the recess closing position, and means operable after a predetermined time period following release of the parachutes and connected load from an aircraft for releasing said securing means for movement to a position in which said recess is no longer closed thereby.

2. A parachute load connector comprising, a body member including a pair of spaced parallel plates having means at their lower ends to connect a load to the body member, means providing coinciding recesses in one vertical side edge of said parallel plates, a normally-horizontal bar having one end pivoted between said plates at the upper end thereof and adapted to carry a plurality of bar-embracing parachute connectors, a swinging latch mounted on the other end of said bar and having a transversely extending portion extending into said coinciding recesses, spring-actuated means acting to bias said portion in a direction out of said recesses, securing means rotatably mounted on said body member to close said recesses and prevent ejection of said latch portion therefrom, means to retain said securing means in the recess closing position, and means operable after a predetermined time period following release of the parachutes and connected load from an aircraft for releasing said securing means for movement to a position in which said recesses are no longer closed thereby.

3. A parachute load connector comprising, a body member including a pair of spaced parallel plates having means at their lower ends to connect a load to the body member, means providing coinciding recesses in one vertical side edge of said parallel plates, a normally-horizontal bar having one end pivoted between said plates, a plurality of parachute connectors each including a pair of relatively pivoted fingers for embracing said bar and maintained in the bar-embracing relation by engagement of the lower ends of said fingers with the oppositely confronting faces of said pair of parallel plates, a swinging latch mounted on the other end of said bar and having a transversely extending portion extending into said coinciding recesses, spring-actuated means acting to bias said portion in a direction out of said recesses, securing means rotatably mounted on said body member to close said recesses and prevent ejection of said transversely extending latch portion therefrom, means to retain said securing means in the recess closing position, and means operable after a predetermined time period following release of the parachutes and connected load from an aircraft for releasing said securing means for movement to a position in which said recesses are no longer closed thereby.

4. A parachute load connector comprising, a body member including a pair of spaced parallel plates of rectangular plan having means at their lower ends to connect a load to the body member, means providing coinciding recesses in one vertical side edge of said parallel plates with the upper sides of the recesses being slightly hollowed out, a normally-horizontal bar having a bend at one end pivoted between said plates near the upper horizontal edges thereof, a plurality of parachute connectors each including a pair of relatively pivoted fingers for embracing said bar and maintained in the bar-embracing relation by engagement of the lower ends of said fingers with the oppositely confronting faces of said pair of parallel plates near the upper horizontal edges thereof, a swinging latch mounted on the other end of said bar and having a transversely extending portion extending into said coinciding recesses, a spring-actuated swinging member mounted between said pair of plates and acting to bias said portion in a direction out of said recesses, securing means rotatably mounted on said body member to close said recesses and prevent ejection of said transversely extending latch portion therefrom, means to retain said securing means in the recess closing position, and means operable after a predetermined time period following release of the parachutes and connected load from an aircraft for releasing said securing means for movement to a position in which said recesses are no longer closed thereby.

5. A parachute load connector as recited in claim 4, wherein said normally-horizontal bar includes a lower edge portion beveled on opposite sides to assist in spreading said relatively pivoted fingers apart when said bar swings away from the upper edges of said parallel plates.

JAMES L. HIGHT.

No references cited.